(12) United States Patent
Chang et al.

(10) Patent No.: US 6,501,941 B1
(45) Date of Patent: Dec. 31, 2002

(54) METHOD FOR IDENTIFYING GROWTH LIMITS OF HANDHELD SERVICES FOR MOBILE SATELLITE COMMUNICATIONS

(75) Inventors: Donald C. D. Chang, Thousand Oaks; Kar W. Yung, Torrance; David C. Cheng, Palos Verdes Estates; Urban A. Von Der Embse, Los Angeles; John I. Novak, III, West Hills; Frank A. Taormina, El Segundo; Ming U. Chang, Rancho Palos Verdes, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/432,440

(22) Filed: Nov. 2, 1999

Related U.S. Application Data
(60) Provisional application No. 60/125,731, filed on Mar. 23, 1999.

(51) Int. Cl.[7] .............................................. H04B 7/185
(52) U.S. Cl. ..................................... 455/13.1; 455/427
(58) Field of Search .............................. 455/11.1, 12.1, 455/13.1, 13.2, 13.3, 13.4, 427, 428, 429, 430

(56) References Cited

U.S. PATENT DOCUMENTS

| | | | |
|---|---|---|---|
| 4,637,017 A | * | 1/1987 | Assal et al. ................ 455/13.4 |
| 5,319,673 A | | 6/1994 | Briskman ...................... 375/1 |
| 5,722,042 A | * | 2/1998 | Kimura et al. ............. 455/13.1 |
| 5,757,767 A | | 5/1998 | Zehavl ....................... 370/208 |
| 5,764,189 A | | 6/1998 | Lohininger ................. 343/700 |
| 5,765,098 A | | 6/1998 | Bella ......................... 455/13.3 |
| 5,828,339 A | | 10/1998 | Patel .......................... 343/700 |
| 5,839,053 A | | 11/1998 | Bosch et al. ............... 455/13.1 |
| 5,890,679 A | * | 4/1999 | Chethik ...................... 455/427 |
| 5,896,107 A | | 4/1999 | Hyunh ........................ 343/700 |
| 5,924,014 A | * | 7/1999 | Vanden Heuvel et al. . 455/13.1 |
| 5,995,041 A | | 11/1999 | Bradley et al. ............. 342/357 |
| 6,301,313 B1 | | 10/2001 | Gevargiz et al. ............ 375/340 |
| 6,314,269 B1 | | 11/2001 | Hart et al. .................. 455/12.1 |
| 6,333,924 B1 | * | 12/2001 | Porcelli et al. ............. 455/13.1 |
| 6,337,980 B1 | | 1/2002 | Chang et al. ................ 455/430 |

OTHER PUBLICATIONS

U.S. patent Ser. No.09/546,929, Von der Embse et al., filed Apr. 11, 2000.
U.S. patent Ser. No. 09/376,942, Chang et al., filed Aug. 18, 1999.
U.S. patent Ser. No. 09/432,439 Chang et al., filed Nov. 02, 1999.

* cited by examiner

*Primary Examiner*—Vivan Chang
*Assistant Examiner*—Eliseo Ramos-Feliciano
(74) *Attorney, Agent, or Firm*—V. D. Duraiswamy; M. W. Sales (57) ABSTRACT

Methods for increasing the efficiency of satellite constellation operations are disclosed. The steps of the present invention comprise calculating the maximum number of communications signals that each satellite in the satellite constellation can generate, determining an operational constraint on each satellite, the operational constraint limiting the number of communications signals that each satellite can radiate substantially simultaneously, determining an operational space for each satellite wherein the operational space is defined using the operational constraint and the calculated number of signals, and using the operational space for each satellite in the constellation to determine the operational point for the constellation.

11 Claims, 10 Drawing Sheets

METHOD FOR IDENTIFYING GROWTH LIMITS OF HANDHELD SERVICES FOR MOBILE SATELLITE COMMUNICATIONS

CROSS-REFERENCE TO RELATED APPLICATIONS

This application claims the benefit under 35 U.S.C. § 119(e) of U.S. patent application Ser. No. 60/125,731, entitled "IDENTIFICATION OF GROWTH LIMITS FOR AND TECHNIQUES TO FULLY UTILIZE SPACE ASSETS FOR MOBILE COMMUNICATIONS," filed on Mar. 23, 1999, by Donald C. D. Chang, et al, and is related to the following applications:

Application Ser. No. 09/432,439 entitled "TECHNIQUES FOR UTILIZATION OF BANDWIDTH SPACE ASSETS," filed on Nov. 2, 1999, by Donand C. D. Chang, et al.; which application is hereby incorporated by reference herein.

BACKGROUND OF THE INVENTION

1. Field of the Invention

This invention relates in general to satellite communications, and, in particular, to methods for identifying growth limits of handheld services for mobile satellite communications.

2. Description of Related Art

Communications satellites are in widespread use. The communications satellites are used to deliver television and communications signals around the earth for public, private, and military uses.

The primary design constraints for communications satellites are antenna beam coverage and radiated Radio Frequency (RF) power. These two design constraints are typically thought of to be paramount in the satellite design because they determine which customers on the earth will be able to receive satellite communications service.

Satellite weight is also a factor, because launch vehicles are limited as to how much weight can be placed into orbit. Lower orbits, such as Low Earth Orbit (LEO), and Medium Earth Orbit (MEO), also known as Intermediate Circular Orbit (ICO) do not require as large of a launch vehicle per pound of satellite weight, but LEO and MEO satellites are also weight limited. Since launch costs are large, the satellite must be utilized as much as possible in order to make the satellite commercially viable. If there is not enough usage of the satellite, the satellite manufacturer or the satellite owner will not be able to recoup the financial outlay for the satellite, thus decreasing the available worldwide communications links.

Proper selection of beam coverage, radiated RF power, and weight do not guarantee that the satellite services, also known as "space assets," are utilized in an efficient or complete manner. For example, the fact that a satellite transponder channel has enough radiated RF power supplied by an RF amplifier, and the satellite has a proper antenna to direct the transponder channel to a given area on the earth's surface, does not guarantee full utilization of the transponder signal. The bandwidth of the signal must be reviewed, analyzed, and configured to fully utilize the transponder channel to maximize the usage of the space asset, i.e., the transponder channel.

Further, as the assets operating on satellite systems become saturated, a typical response by satellite operators is to launch more satellites into the constellation to provide more services. These responses are made without regard to space asset efficiency and/or whether the launch of additional satellites will be cost efficient in terms of being able to provide additional communications links. At times, the launch of additional satellites into a constellation will provide diminishing returns.

From the foregoing, it can be seen that there is a need in the art for techniques to review, analyze, and configure a satellite constellation to fully utilize the space assets of the satellite constellation. It can also be seen that there is a need in the art to provide a tool to determine the growth limit of a satellite constellation. It can also be seen that there is a need in the art to provide more complete utilization of space assets without dramatically increasing the cost of manufacturing and operating a satellite.

SUMMARY OF THE INVENTION

To overcome the limitations in the prior art described above, and to overcome other limitations that will become apparent upon reading and understanding the present specification, the present invention discloses methods for operating a satellite constellation at an increased efficiency operational point. One method comprises the steps of calculating the maximum number of communications signals that each satellite in the satellite constellation can generate, determining an operational constraint on each satellite, the operational constraint limiting the number of communications signals that each satellite can radiate substantially simultaneously, determining an operational space for each satellite wherein the operational space is defined using the operational constraint and the calculated number of signals, and using the operational space for each satellite in the constellation to determine the operational point for the constellation.

An object of the present invention is to provide techniques to review, analyze, and configure a satellite to fully utilize the space assets of the satellite. Another object of the present invention is to provide more complete utilization of space assets without dramatically increasing weight. Still another object of the present invention is to provide more complete utilization of space assets without dramatically increasing the cost of manufacturing and operating a satellite.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Overview

Communications satellites are typically thought of as power limited, e.g., the spacecraft can only deliver a certain amount of Effective Incident Radiated Power (EIRP) over a given area on the earth's surface. The power limitation constraint ensures the validity and consistency of the communications link between the earth's surface and the satellite, but does so by sacrificing the satellite's bandwidth capabilities.

The present invention describes techniques to make mobile satellite communications operations more effective and more profitable for satellite operators without altering the satellite space assets or satellite services. Typical mobile satellite systems operate in power limited states, and are not effective in bandwidth utilization. The techniques of the present invention are cost effective for satellite operators as well as satellite users.

The techniques of the present invention allow present and future satellites, e.g., LEO/MEO mobile communications operators, to provide low cost global medium speed data transport while shifting the space asset operations into more power and bandwidth efficient states. Further, geosynchronous satellite operators can reap similar benefits when regional voice and low speed data transport requires more than one satellite in the same region.

The most precious elements of satellite services for mobile communications are RF power and frequency spectrum. Most of mobile satellite communications designs today have become more efficient than before via multiple beam payloads on each satellite. As a result, high gain beams deliver more EIRP with less RF power from satellites. In addition, frequency spectrum can be reused many times through beam isolation.

However, the majority of targeted mobile users on ground will use handsets, which provide voice and low speed digital data transfer. Handset designs usually feature omnidirectional antennas to eliminate directional tracking requirements by telephone communications systems. However this feature of handset design will prevent mobile users in the same geographical area from using the same spectrum through different satellites. This elimination of bandwidth from neighboring satellites is caused by the inadequate spatial isolation between handsets, which is a direct result of use of omnidirectional antennas in the handset design. When there are two or three satellites within the Field-Of-View (FOV) of nearby users, 50% or 66.7% of the potentially available spectrum (bandwidth) can not be used, respectively, because the first mobile user effectively "blocks" the neighboring satellites from using that spectrum for any other purpose. The inefficiency of the system grows as the number of satellites within a given FOV increases. As a result, the hard-earned available bandwidth created by advanced designs in the space assets through frequency reuse cannot be fully utilized by the mobile operators. Only the RF power can be fully utilized but not the available spectrum (bandwidth).

The present invention provides techniques for effective overall resource management, including bandwidth allocation to geographic areas. The techniques used in the present invention balance the utility of various elements of resources through injection of different applications, different users, and different system management techniques. The use of these management techniques of the present invention translate the new additional applications into cost reductions as well as expanding the satellite communications capabilities.

The techniques of the present invention dynamically optimize the total system space assets. A system implementing the techniques of the present invention comprises multiple applications and multiple application data rates. Each application represents a segment that consumes a mixture of resources per user. Every operation point in the multi-dimensional (resource, traffic, and revenue) space indicates a unique mixture of users from all applications. The multi-dimensional space graphs described herein provide operational points that increase the efficiency and decrease the cost outlays for satellite space assets. Linear programming or other similar techniques can be used to identify the optimum operation point for a given space asset. Throughout the remainder of the present application, the space asset is assumed to operate at the optimum operation point, however, the spacecraft can operate at less than optimum operation without deviating from the scope of the present invention.

The present invention can also incorporate a wavelet finite impulse response (WFIR) waveform technology. The WFIR technology provides more bandwidth efficient modulation and more tolerance to channel imbalance.

Although the illustrations of the present invention provided herein discuss only Frequency Division Multiple Access (FDMA), Code Division Multiple Access (CDMA) techniques discussed using WFIR waveforms can also be used in conjunction with the present invention to spread information over a larger bandwidth to reduce the required power density over frequencies much lower than those from narrow band voice and digital data.

These techniques when used with the present invention improve the channel packing efficiency and assure that a single set of the filter coefficients for optimum detection can be used for services with different data rates.

Further, a low cost high gain tracking antenna technology for ground terminals can be used with the present invention to provide connectivity between ground users and satellites, and to provide spatial isolation between geographically proximate users to allow simultaneous communications with different satellites at the same frequency. Multiple beams can also be used to achieve this increase in capability, but it is not required to implement the present invention. Ground user terminals with high gain antennas shall require less RF power consumption in the space asset to maintain the communications links having higher data rates. Further, these user terminals with high direction-discrimination capability will enhance overall communications capacities in a given geographical area because more communications links will be available at the same frequency via multiple satellites.

For ease of understanding the principles of the present invention, examples will be described herein using two different applications that require different mixes of resources. The present invention is not limited to two different applications; the application requirements and resource combinations are not limited in terms of bandwidth or space asset allocation, but merely by the number of users that the application and resource combinations can service in a geographic area. Further, the principles of the present invention can be applied to other mobile systems using multiple satellites individually, and among multiple mobile satellite systems using the same frequency bands within a given geographic region.

Satellite Constellation Example

Figure 1:
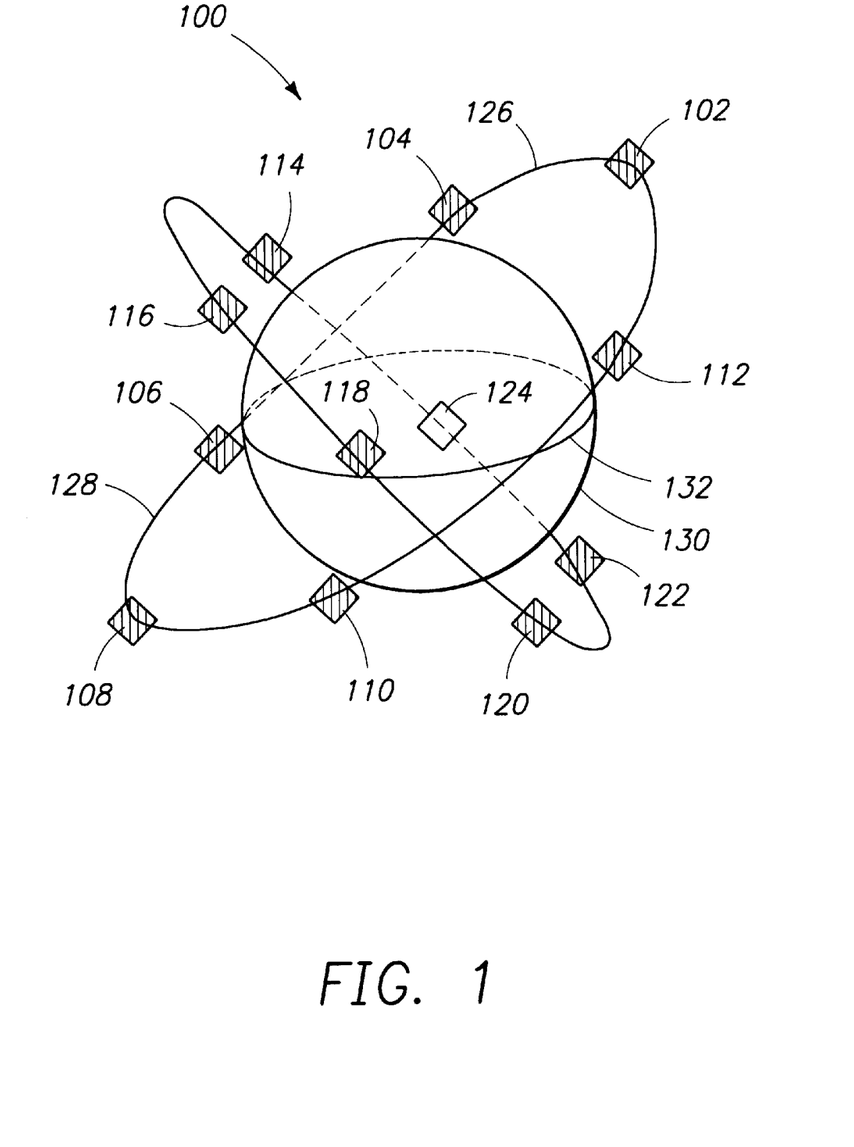
FIG. 1 illustrates a typical satellite constellation that employs the principles of the present invention.

FIG. 1 illustrates a typical satellite constellation that employs the principles of the present invention.

The constellation 100 for a typical global communications network comprises 12 MEO satellites 102–124 in two 45 inclined planar orbits 126 and 128. MEO satellites 102–112 are located in orbit 128 and MEO satellites 114–124 are located in orbit 126. The orbits 126 and 128 are substantially circular and have a radius approximately 10,000 km above the surface of the earth 130. One MEO satellite 102–124 in each orbit 126 and 128 is typically an additional in-orbit spare, but is not required to be a spare MEO satellite 102–124. Thus, the constellation 100 may actually contain 12 operational MEO satellites 102–124, or only 10 MEO satellites 102–110 and 114–122, randomly designating MEO satellites 112 and 124 as the in-orbit spare satellites. MEO satellite 124 is shown unshaded to indicate that it is located on the other side of the earth 130, e.g., substantially opposite MEO satellite 118 in orbit 126. Since there are six MEO satellites 102–124 in two orbits 126 and 128, each orbit contains 6 MEO satellites 102–124 at approximately 600 separations in each orbit 126 and 128.

For a 10 operational satellite constellation 100 as described above, there are 2.5 "visible" MEO satellites 102–110 and 114–122, on average in time and space, by users on the surface of the earth. Visible MEO satellites 102–110 and 114–122 are defined as satellites within the field of view (FOV) of a given longitudinal and latitudinal geographical location, wherein the MEO satellites 102–110 and 114–122 have a minimum elevation angle of 0° for that given geographical location. Users at geographical locations near the equator see slightly more satellites in average than those users at medium latitudes. For a 12 MEO satellite 102–124 constellation 100, the average number a ground based user can see increases to 3 satellites.

The MEO satellites 102–124 provide connectivity to and from about 163 beam positions via a spoke-and-hub architecture. The on-board digital processors on the MEO satellites 102–124 perform the functions of beam-forming, signal channeling & filtering, as well as switching & re-formatting.

Each MEO satellite 102–124 provides a spectral bandwidth at a given RF frequency band, e.g., S-band, C-band, etc. Within each RF frequency band, the bandwidth is divided into smaller portions called subbands, where the subbands are used for communications purposes. Typical divisions of the frequency band would result in 512 subbands each for forward and return links per MEO satellite 102–124, although the frequency band can be divided into a greater or lesser number of subbands if desired. For typical MEO satellites 102–124, 490 out of the 512 subbands are available for subscriber usage and 32 for satellite house keeping functions.

Subband Operation and Usage

Figure 2:
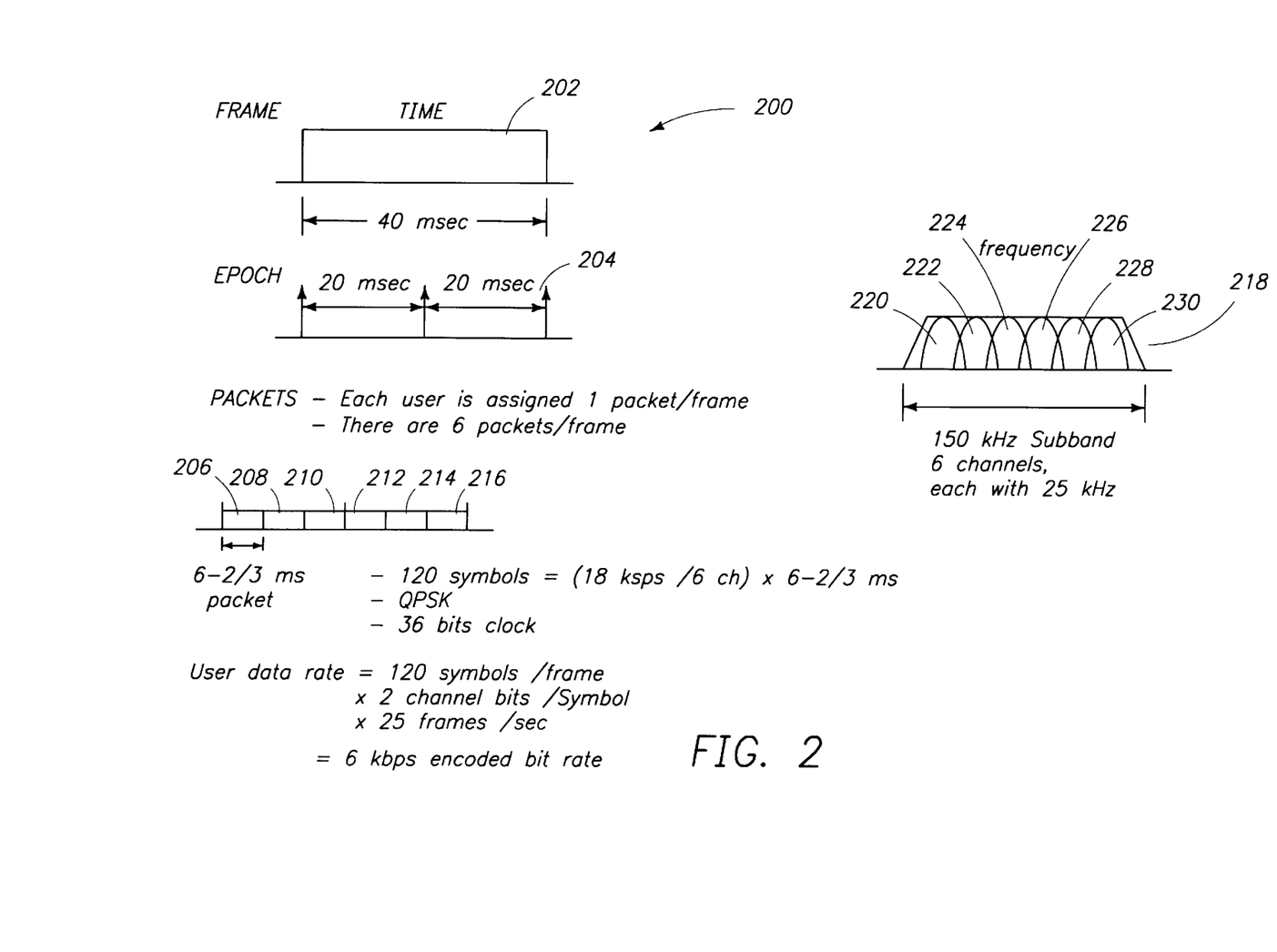
FIG. 2 illustrates the subbands and division of a typical frame of data used by the present invention.

FIG. 2 illustrates the subbands and division of a typical frame of data used by the present invention.

Data structure 200 illustrates a typical frame 202 of communications data. Frame 202 is shown as 40 milliseconds (msec) in length, but can be of greater or lesser duration. Each frame 202 is divided as shown in epoch 204, wherein epoch 204 contains two equal length portions of frame 202.

Within frame 202, packets 206–216 are shown. Each packet 206–216 is 6.67 msec in length and contains 120 symbols. With 120 symbols per frame 202, 2 channel bits per symbol, and 25 frames 202 per second, this is equivalent to a 6 kilobit per second (kbps) bit rate for the data structure 200.

Each packet 202–216 is transmitted in a given frequency band. The frequency band is divided up by frequency into smaller units, called subbands 218. Subbands 218 are bandwidths of signals which are grouped and processed on board the satellites 102–124. The number of subbands 218 on board are digital, non-regenerative repeater payloads and shall be viewed as the bandwidth processing capability of the spacecraft. Each subband 218 is typically 150 kHz in bandwidth. Subbands 218 are flexibly assigned to antenna beam positions and frequency slots within the data structure 200 of the MEO satellite 102–124. Multiple subbands 218 can be assigned to a given antenna beam position, and a single subband 218 can be time-shared by multiple antenna beam positions. Subbands 218 are typically operated in a multi-carrier Time Division Multiple Access (TDMA) mode as described with respect to frame 202 and packets 206–216 above, but can also be operated in a CDMA mode if desired.

Each subband 218 has six 25 kHz channels 220–230. There can be a greater or lesser number of channels 220–230 depending on the Frequency Division Multiple Access (FDMA) schema desired. The six channels 220–230 have a carrier and are TDMA modulated into the six packets 206–216 per frame 202, and thus, the data structure provides up to 36 communication channels simultaneously per frame 202. If the number of packets 206–216 and the number of channels 220–230 change, a greater or lesser number of communication channels would be available for usage.

RF signals are used to transmit the data structure from the MEO satellite 102–124 back to earth 130. The communication payload on a MEO satellite 102–124 typically consumes about 5.1 kilowatts (kW) power, of which 700 watts are radiated via RF signals through 127 Solid-State Power Amplifiers (SSPAs).

Because of the limitation on the power available for transmission of the data structure 200, the communications system of the MEO satellites 102–124 can only support approximately 4500 telephone circuits simultaneously by sharing the 700 W RF radiation among the communications signals 220–230 that are to be transmitted back to earth 130. Each signal 220–230 requires 0.156 W radiated RF power in the MEO satellite 102–124 downlink signals.

Although there are typically four hundred and ninety subbands 218 fully utilized for voice and low speed data transport on a MEO satellite 102–124, approximately one hundred and twenty-five of the subbands 218 are available for voice and low speed data transport purposes because of power limitations in the MEO satellite 102–124 and frequency coordination with other MEO satellites 102–124. A large percentage of the available subbands 218 will not be fully utilized in a given earth 130 geographical area because of interference between one MEO satellite 102–124 and another MEO satellite 102–124 on a given channel 220–230 used by a single user, because that user effectively blocks the channel 220–230 from all MEO satellites within that user's FOV.

MEO satellites typically only provide telephone and other Low Data Rate (LDR) services to customers. However, as shown above, some channels on MEO satellites 102–124, although available and can be delivered to a geographical earth 130 location, are not utilized. The present invention employs intelligence in the system management of the constellation 100 to enable those unused channels 220–230 to be utilized by a different class of users without sacrificing the use of the channels 220–230 by LDR users.

Although described with respect to two classes of service, e.g., LDR and Medium Data Rate (MDR), the technique of the present invention can be extended to additional classes of service, e.g., High Data Rate (HDR), Very Low Data Rate (VLDR), and other additional services simultaneous with LDR and MDR service.

Although LDR service can consume all of the available power generated by a typical MEO satellite 102–124 (e.g., 700 W) as described above, all of the available subbands 218 are not utilized in the constellation 100. In order to utilize the allocated power and available subbands 218 more efficiently in terms of both cost and data throughput, the present invention utilizes a second data rate service, called "MDR service," within constellation 100. The MDR service can provide, for example, 144 kbps connectivity to mobile users with high gain directional antennas which provide a higher power density signal to MEO satellites 102–124.

Multiple Data Rate Service Scenario

Figure 3:
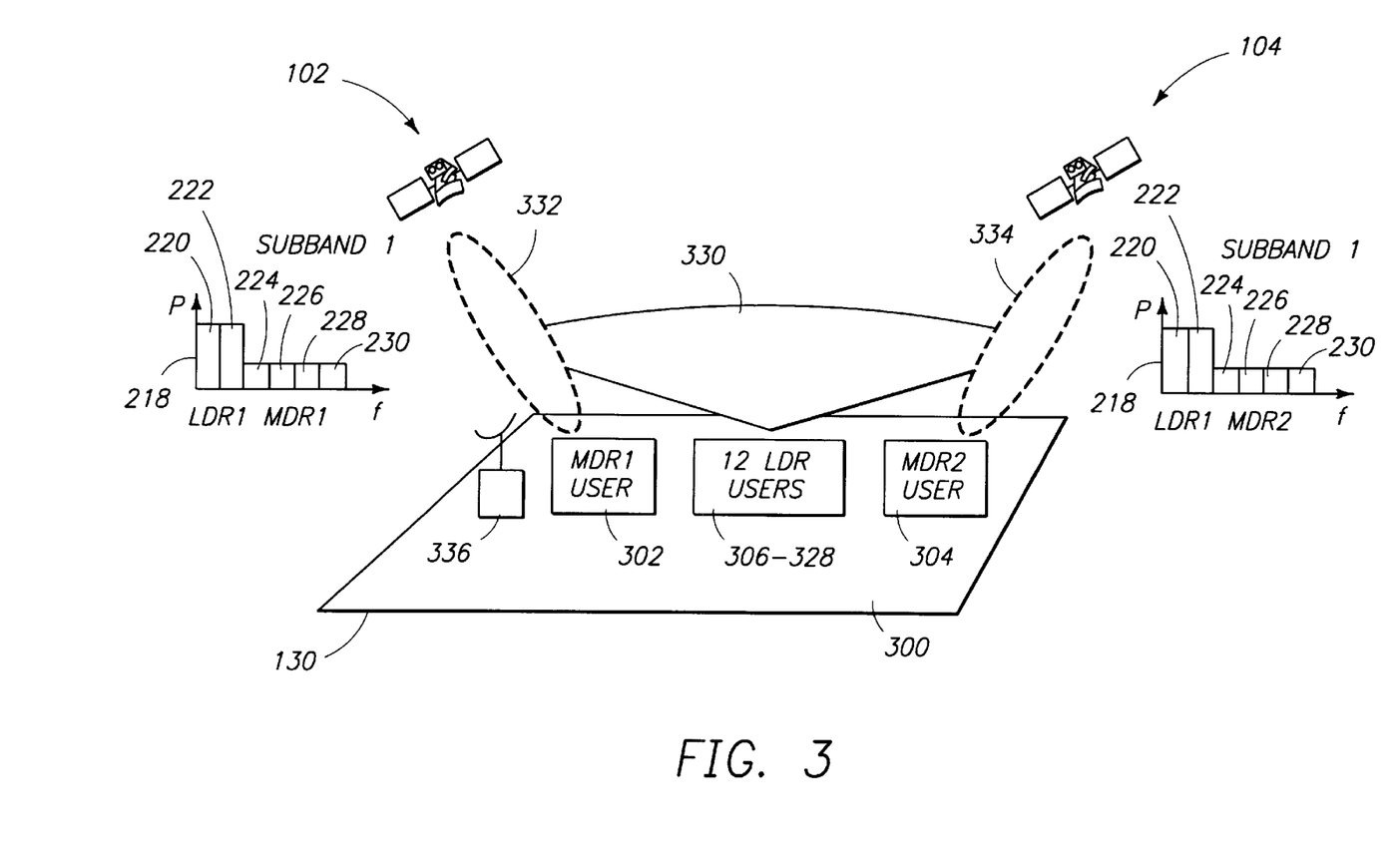
FIG. 3 illustrates a multiple data rate service scenario utilizing the present invention.

FIG. 3 illustrates a multiple data rate service scenario utilizing the present invention.

FIG. 3 illustrates two MEO satellites 102 and 104, that are visible from a geographic earth 130 region 300. Within that geographic region 300, there are, as an example, fourteen communications services users, namely, MDR1 user 302, MDR2 user 304, and twelve LDR users 306–328.

The fourteen communications services users, MDR1 user 302, MDR2 user 304, and the twelve LDR users 306–328 are all using the MEO satellite subbands 218 simultaneously. As shown, the 12 LDR users 306–328 are sharing two channels of subband 218, namely channels 220 and 222. Because the 12 LDR users 306 and 328 have a FOV 330 that covers both MEO satellite 102 and MEO satellite 104, only one MEO satellite 102 or 104 can utilize channels 220 and 222 for communications purposes, because utilization of channels 220 and 222 from both MEO satellite 102 and MEO satellite 104 would create interference for LDR users 306–328. As shown in FIG. 3, MEO satellite 104 radiates RF signals for the LDR users 306–328.

Although MEO satellites 102 and 104 are both visible to MDR1 user 302 and MDR user 304, MDR1 user 302 utilizes an antenna that restricts the FOV 332 of MDR1 user 302 to only be able to see MEO satellite 102, and MDR2 user 304 utilizes an antenna that restricts the FOV 334 of MDR2 user 304 to only be able to see MEO satellite 104. As MEO satellite 102 traverses the FOV 332 of MDR1 user 302, the antenna will track MEO satellite 102 to maintain the communications link between MDR1 user 302 and MEO satellite 102. As MEO satellite 102 disappears from view of MDR1 user 302, the antenna of MDR1 user 302 will acquire another MEO satellite, e.g., 112, and track the motion of MEO satellite 112, to maintain the communications link between MDR1 user 302 and whatever MEO satellite 102–124 is capable of delivering communications services to MDR1 user 302. Similar functions are performed by MDR2 user 304.

The antennas used by MDR1 user 302 and MDR2 user 304 have restricted beamwidths, e.g., FOV 332 and FOV 334. These reduced beamwidths provide not only directionality to an individual MEO satellite 102 or 104 in constellation 100, but allow MEO satellites 102 and 104 to both utilize channels 224–230 of subband 218 simultaneously without substantial interference. MDR1 user 302 utilizes channels 224–230 at a given frequency subband 218 to communicate with MEO satellite 102; at the same time, MDR2 user 304 utilizes channels 224–230 of the same frequency subband 218 to communicate with MEO satellite 104; simultaneous with those communication links, LDR users 306–328 are using channels 220–222 of the same frequency subband 218 to communicate with MEO satellite 104. There is no substantial interference between the communications between MEO satellite 102 and MDR1 user 302 and the communications between MEO satellite 104 and MDR2 user 304, nor is there any substantial interference between the MDR users 302–304 communications and the LDR users 306–328 communications. Substantial interference is defined as interference that would not allow both communications to occur without significant errors in data and/or crosstalk interference between the two communications links.

This simultaneous use of channels 224–230 at the same frequency subband 218 for two MEO satellites 102–104 that are in simultaneous view of a region 300 allows the constellation 100 to support additional data throughput without additional power requirements for any MEO spacecraft 102–124 within the constellation 100. This allows constellation 100 to generate additional data streams, and, as such, additional revenue for the satellite owner/operator which enables the satellite owner/operator to lower costs of providing services to users 302–328, and/or provide additional services to users 302–328.

Further, although channels 218–222 of MEO satellite 102 are shown as unused, channels 218–222 from MEO satellite 102 can be radiated at a lower signal strength (power) to users 336 that have higher gain antennas within region 300. The lower signal strength radiation will not interfere with LDR users 306–328 because the LDR user 306–328 receivers will not be able to detect the lower power radiated signals, and will not interfere with MDR1 user 302 or MDR2 user 304 because of the difference in frequency. This complete reuse of the channels 220–230 of MEO satellites 102 and 104 that are visible from the same region 300 on earth 130 provides additional cost savings and data throughput not currently available.

Certain constellations 100 and/or certain users 302, 304, and 336 may not be able to utilize the directional diversity present in the present application, because the MEO satellites 102 and 104 are not spatially diverse enough to avoid the interfering FOV. For example, as shown in FIG. 3, if MEO satellites 102 and 104 were not spatially diverse enough to allow FOV 332 and FOV 334 to only see one MEO satellite 102 or 104, the diversity arrangement of the present invention would not be available, either in that region 300 or during that time period of the orbit 128. As the number of MEO satellites 102–124 in constellation 100 increases, more MEO satellites 102–124 will be within a given FOV, i.e., FOV 332. However, since there will be more satellites within both FOVs 332 and 334, the antenna systems of MDR1 user 302 and MDR2 user 304 can be directed by constellation 100 to point to the MEO satellites 102 and 104 that are the most spatially diverse within the constellation to overcome such limitations.

System Parameters

Within constellation 100, the total RF power on each MEO satellite 102–124 associated with non-LDR users, e.g., MDR1 user 302, is highly dependent on the directionality and the antenna gain located at the non-LDR user locations. If sufficient directionality and antenna gain are present, then the channels 220–230 can use lower power density per channel 220–230 for non-LDR users 302, 304, and 336. For example, the signals for MDR channels 220–230 can be designed to spread over an entire subband 218 or multiple subbands 218 via CDMA schemes using wavelet technology. This is one of the advantages of using CDMA techniques.

To determine the cost feasibility for MEO satellites 102–124, and to determine the cost feasibility for the number of MEO satellites 102–124 that should be placed into constellation 100, the gain and directionality of the ground terminals used at MDR1 user 302, MDR2 user 304, and user 336 must be determined. As an example, the cost feasibility will change depending on the gain of the MDR antenna. Table 1 illustrates two types of antennas for use with MDR service; one antenna has a 10 dB directional gain, while the alternate antenna has a 15 dB directional gain.

To illustrate the revenue sensitivity generated by the LDR service and the MDR service on a MEO satellite 102–124, the service fee for a LDR user (4 kbps) with a handset is assigned to be $1.00 per minute, and the service fee for a MDR user (144 kbps) with a high gain terminal is $4.00 per minute. Other service fees can be assigned to each class of service, and, accordingly, the optimal operation point will change depending on the rates charged.

Given these price assumptions, the price to transfer 1 megabit (MB) of data via the LDR service will cost an LDR user 306 $4.167, and the price to transfer 1 MB of data will cost MDR1 user 302 $0.463. A LDR user 306 consumes 0.156 Watt of RF power on board the MEO satellite 102, while a MDR1 user 302 using a 10 dB antenna uses 0.560 Watts of MEO satellite 102 power. If the MDR1 user 302 has a 15 dB antenna, the MEO satellite 102 only has to expend 0.177 Watts of RF power.

For illustration purposes, MDR1 user 302 and MDR2 user 304 will be shown throughout the remainder of the application to comprise 15 dB gain antennas unless otherwise noted.

System Operational Capabilities

Figure 4:
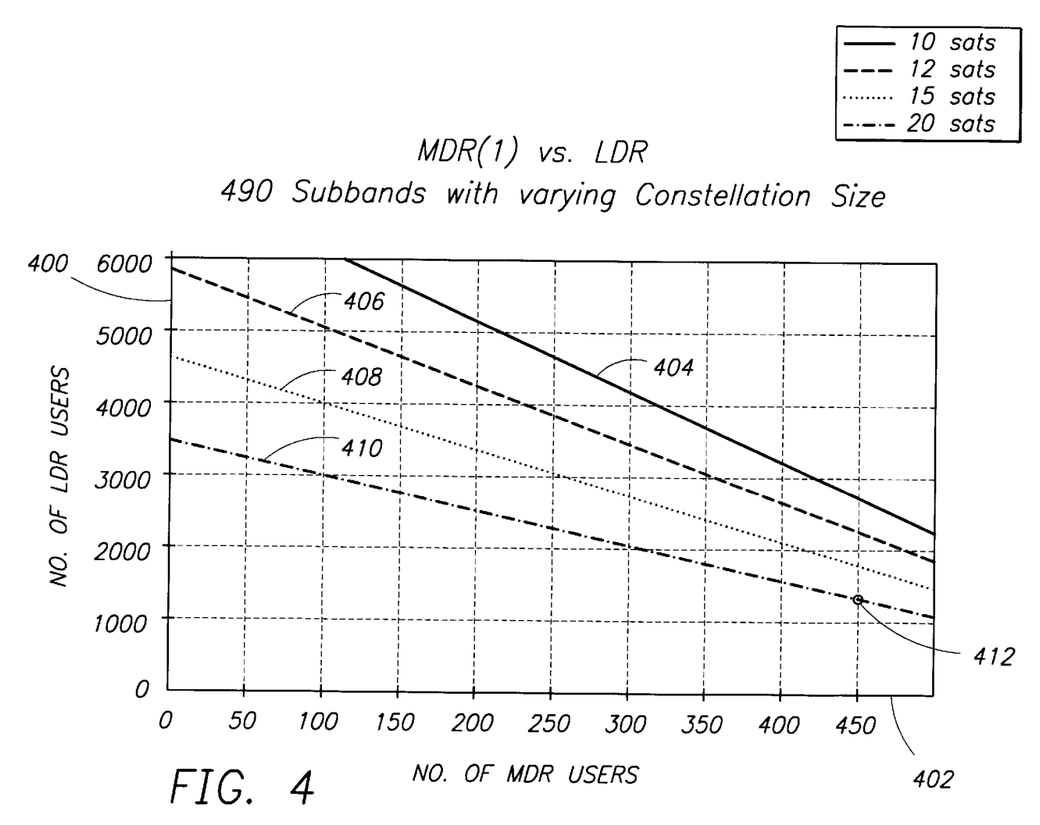
FIG. 4 is a graph illustrating the number of LDR users versus the number of MDR users a typical MEO satellite can support using the present invention.

FIG. 4 is a graph illustrating the number of LDR users versus the number of MDR users a typical MEO satellite can support using the present invention.

To determine the number of users a given MEO satellite 102–126 can support simultaneously, a family of parametric lines for available subbands 218 that are shared by the LDR users 306–328 and other users, e.g., MDR1 user 302, MDR2 user 304, and user 336, will calculate the maximum number of simultaneous users. For a two distinct class service example as described with respect to LDR/MDR service, FIG. 4 illustrates the family of parametric lines with the constraint of four hundred and ninety subbands 218 and without the RF power constraint. Vertical axis 400 indicates the numbers of simultaneous LDR users 306–328, while horizontal axis 402 illustrates the number of simultaneous MDR users 302–304. The family of parametric lines includes distinct lines 404–410, wherein each line 404–410 indicates the number of MEO satellites 102 in constellation 100.

Each line 404–410 assumes that each MEO satellite 102 has 490 subbands 218 available for subscribers. Line 404 corresponds to a constellation 100 having ten MEO satellites 102–124. Line 406 corresponds to a constellation 100 having twelve MEO satellites 102–124. Line 408 corresponds to a constellation 100 having fifteen MEO satellites 102–124. Line 410 corresponds to a constellation 100 having twenty MEO satellites 102–124.

For example, line 410 indicates that a constellation 100 having twenty MEO satellites 102–124 can support either 3500 MDR users 302–304, or about five hundred LDR users 306–328, but not simultaneously. Point 412 on line 410 illustrates that the same constellation 100 can simultaneously support a mixed service with about four hundred and fifty MDR users 302–304 and 1,200 LDR users 306–328. This illustrates that the more MEO satellites 102–124 that are in constellation 100, there is less utilization potential per MEO satellite 102–124 because of the self interference between MEO satellites 102–124 in constellation 100.

Figure 5:
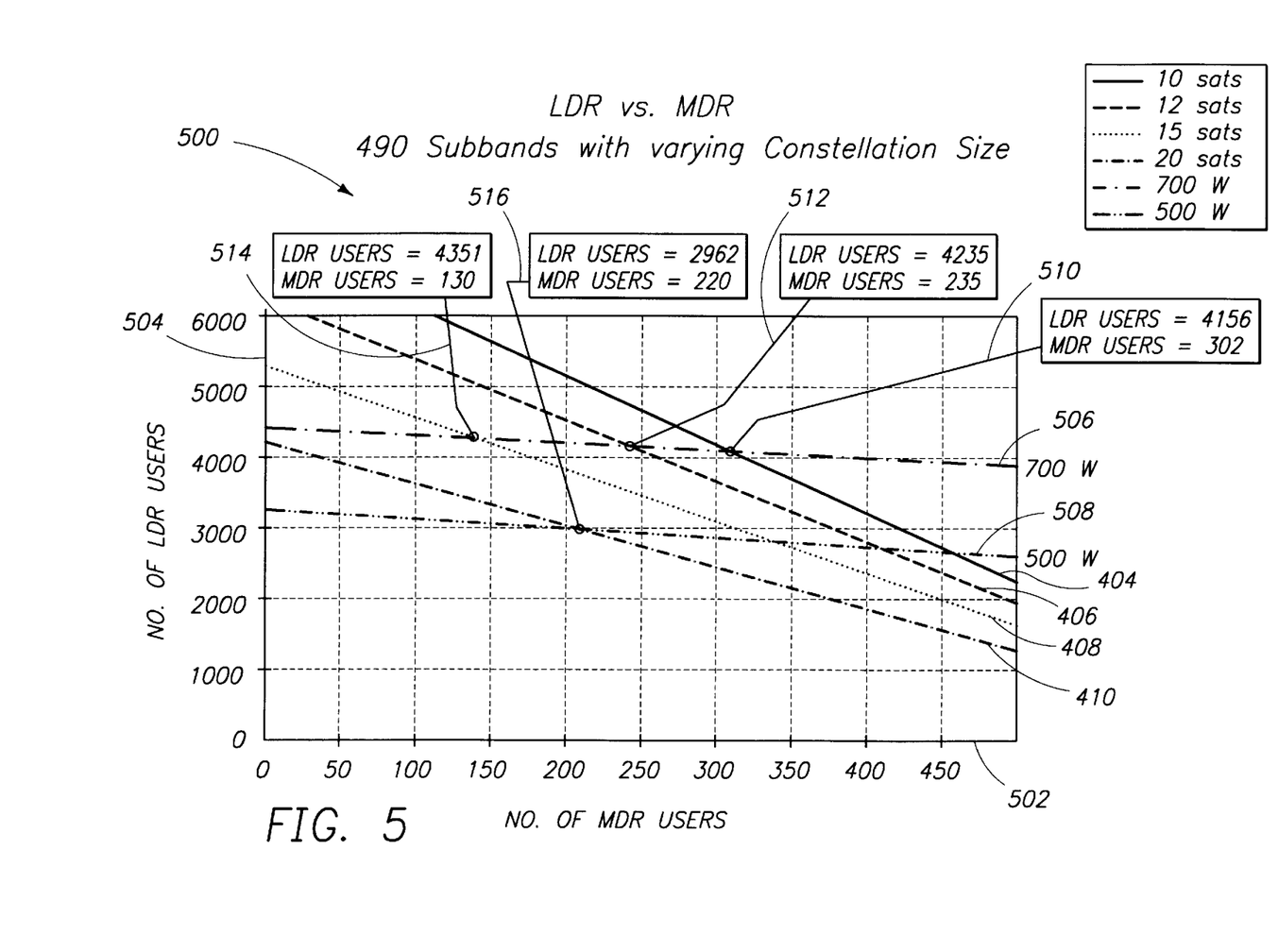
FIG. 5 is a graph illustrating the number of LDR users versus the number of MDR users a typical satellite constellation can support based on the available power of the MEO satellites using the present invention.

FIG. 5 is a graph illustrating the number of LDR users versus the number of MDR users a typical satellite constellation can support based on the available power of the MEO satellites using the present invention.

FIG. 5 illustrates an operational space 500, where horizontal axis 502 indicates the numbers of simultaneous MDR users 302–304, while vertical axis 504 indicates the number of simultaneous LDR users 306–328. Line 506 illustrates the number of users a seven hundred watt MEO satellite 102 can support simultaneously, while line 508 illustrates the number of users a five hundred watt MEO satellite 102 can support simultaneously. When lines 506 and 508 are graphed with lines 404–410, operational space 500 indicates the maximum number of simultaneous LDR users 306–328 and MDR users 302–304 a given spacecraft can support. Points 510–516 indicate the intersections of various lines 404–410 with lines 506–508.

Point 510 indicates that a seven hundred watt MEO satellite 102 in a ten satellite constellation 100 can support 4156 LDR users 306–328 and three hundred and two MDR users 302–304. Point 512 indicates that a seven hundred watt MEO satellite 102 in a twelve satellite constellation 100 can support 4235 LDR users 306–328 and 235 MDR users 302–304. Point 514 indicates that a seven hundred watt MEO satellite 102 in a fifteen satellite constellation 100 can support 4351 LDR users 306–328 and one hundred and thirty MDR users 302–304. Point 516 indicates that a five hundred watt MEO satellite 102 in a twenty satellite constellation 100 can support 2962 LDR users 306–328 and two hundred and twenty MDR users 302–304.

A review of operational space 500 indicates that the typical response to increase user capability, e.g., launch an additional MEO spacecraft 102 into constellation 100, may not have the desired effect of increasing user capability within the system that constellation 100 provides. For example, if there are a large number of MDR users 302–304, as the number of MEO satellites 102–124 increase within constellation 100, the number of simultaneous MDR users 302–304 that the constellation 100 can service decreases. However, if the constellation 100 services only a few MDR users 302–304, and wants to increase the number of LDR users 306–328, additional MEO spacecraft 102 can be launched into constellation 100, as long as the number of MDR users 302–304 that constellation 100 can support is not diminished below the number that exist or are expected to use the constellation 100. Further, operational space 500 shows that a lower power of MEO satellites 102–124 can service similar numbers of users, and thus may assist the constellation 100 designer in designing a properly sized constelllation 100 to meet the needs of users 302–328.

Line 506 is shown as intersecting lines 404, 406, and 408, but not line 410. This indicates that a MEO satellite 102 in a twenty satellite constellation 100 is not power limited, but subband 218 limited, since each MEO satellite 102 can only support 490 subbands 218. There is no intersection between line 410 and line 506 (700 Watts RF per MEO satellite 102), which is an indication that there is no operational condition which can consume both 700 Watts RF and 490 subbands 218 simultaneously with a twenty satellite constellation 100. In such a constellation 100, the constellation becomes power "rich" and bandwidth "poor." In order to circumvent this situation, e.g., additional power that is not utilized, lower power MEO satellites 102–124 shall be considered during the constellation 100 planning stage. For example, MEO satellites 102–124 having 500 Watts of RF power and 490 available subbands 218 shall be considered as one of the possible constellation 100 candidates. The operational space 500 of the present invention assists the constellation 100 designer and operator in determining efficient allocation of constellation 100 resources, as well as assisting in the determination of the operational limits that a given constellation 100 can achieve.

Constellation Sizing

Figure 6:
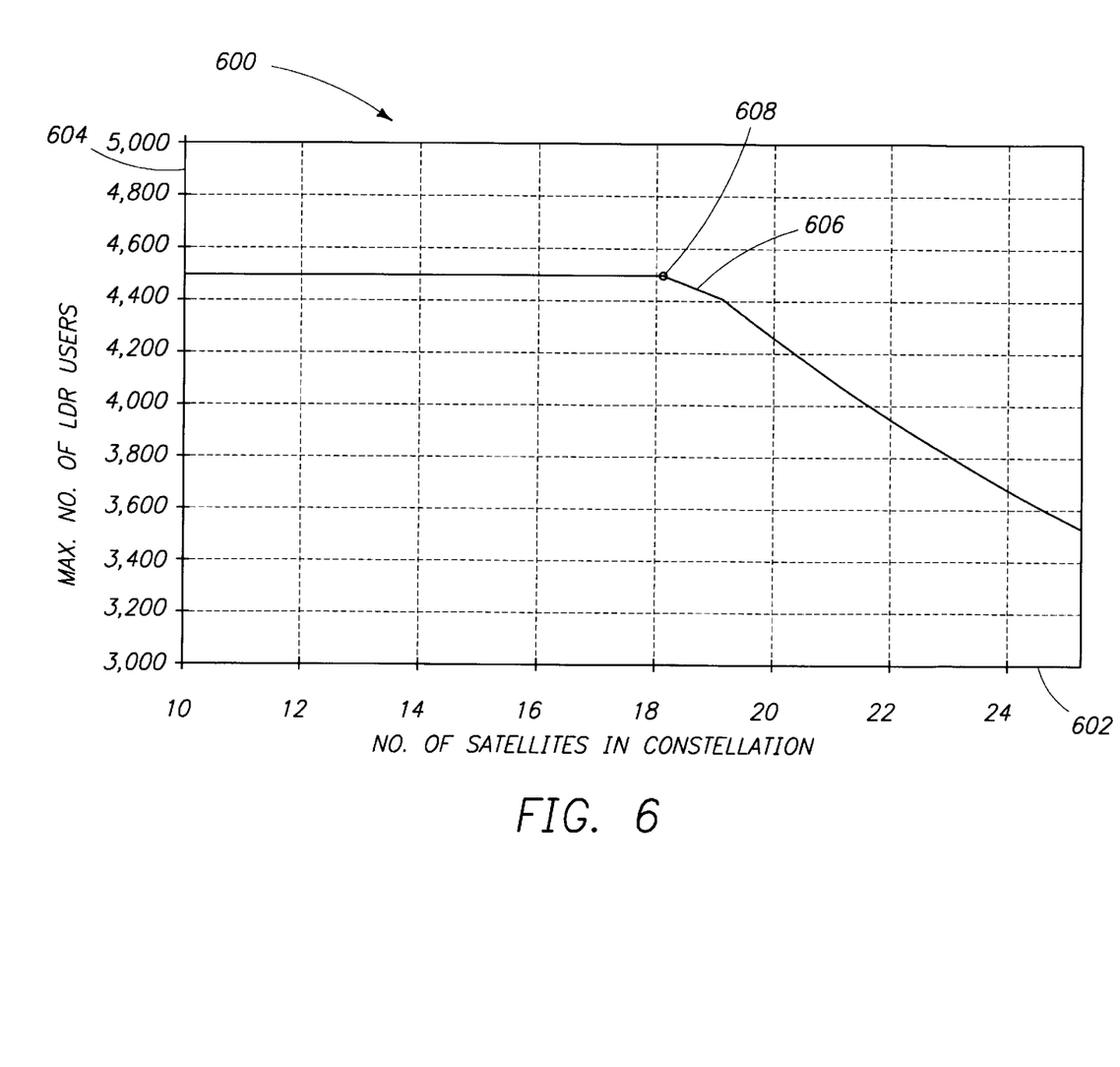
FIG. 6 is a graph illustrating the maximum number of LDR users that each satellite in a constellation can support versus constellation size.

FIG. 6 is a graph illustrating the maximum number of LDR users that each satellite in a constellation can support versus constellation size.

FIG. 6 illustrates an operational space 600, where horizontal axis 602 indicates the numbers of MEO satellites 102–124 in constellation 100, while vertical axis 604 indicates the number of simultaneous LDR users 306–328 per MEO satellite 102–124. Line 606 illustrates the number of simultaneous LDR users 306–328 that can be supported by a given constellation 100. As shown by line 606, which assumes a seven hundred watt MEO satellite 102–124, the maximum number of LDR users 306–328 users a single MEO satellite 102–124 can support is a constant 4500 until there are eighteen MEO satellites 102–124 in constellation 100. As the nineteenth MEO satellite 102–124 is launched into constellation 100, the number of simultaneous LDR users 306–328 that each MEO satellite 102–124 can support begins to decrease. This decrease is caused by the increase in blocking interference between adjacent MEO satellites 102–124. Breakeven point 608 indicates that a slope change on line 608 occurs at eighteen MEO satellites 102–124 in constellation 100.

Figure 7:
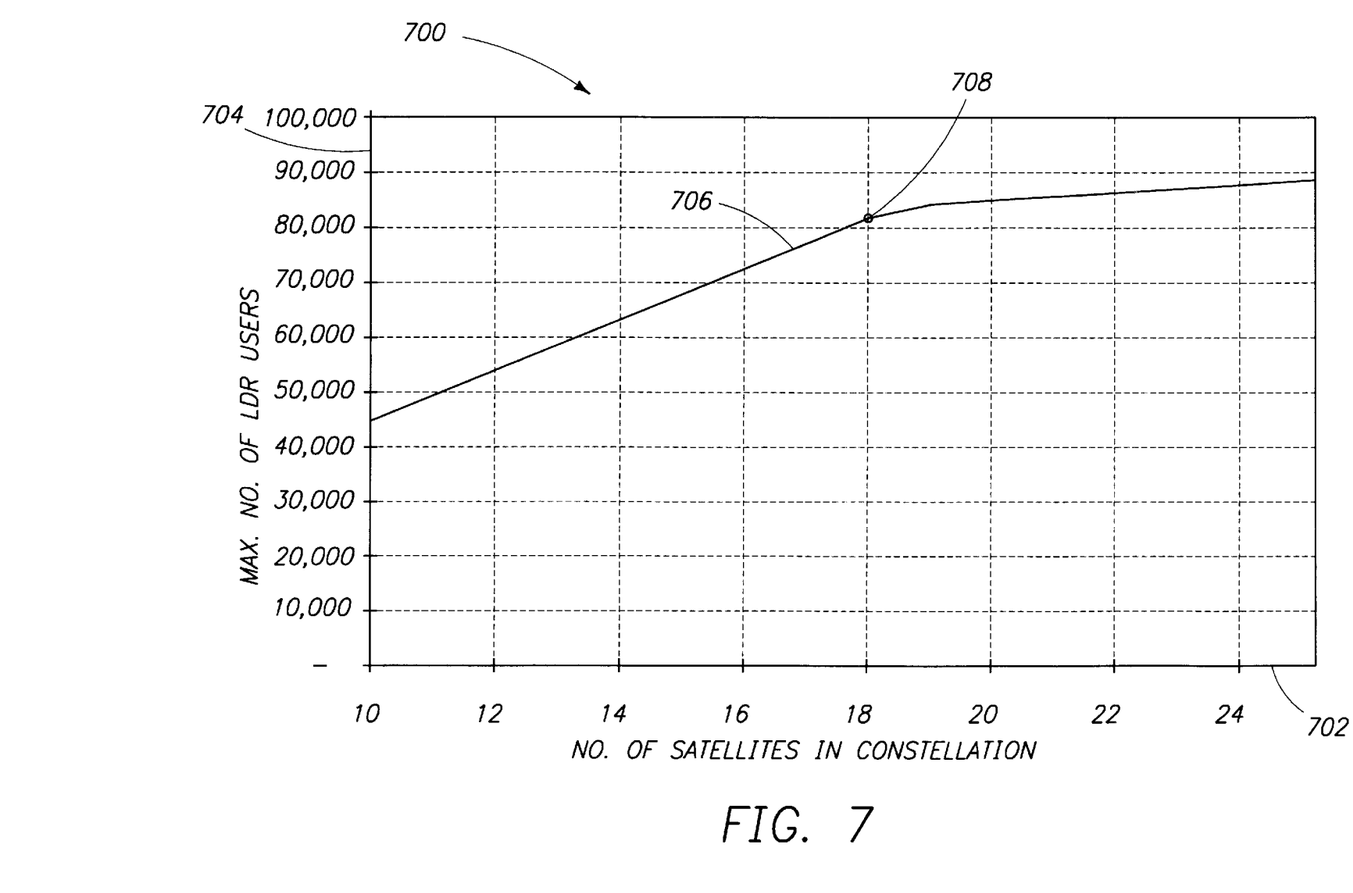
FIG. 7 is a graph illustrating the maximum number of LDR users that each satellite in a constellation can support versus constellation size.

FIG. 7 is a graph illustrating the maximum number of LDR users that each satellite in a constellation can support versus constellation size.

FIG. 7 illustrates an operational space 700, where horizontal axis 702 indicates the numbers of MEO satellites 102–124 in constellation 100, while vertical axis 704 indicates the number of simultaneous LDR users 306–328 that the entire constellation 100 can support. Line 706 illustrates the number of simultaneous LDR users 306–328 that can be supported by the constellation 100. Although line 706 indicates that the total number of LDR users 306–328 continues to increase after there are eighteen MEO satellites 102–124 in constellation 100, the rate of increase drops. The number of simultaneous LDR users 306–328 asymptotically approaches 90,000 as the number of MEO satellites 102–124 increases within constellation 100.

FIGS. 6 and 7 indicate that there is a "breakeven" point for satellites within a given constellation 100, e.g., for the seven hundred watt, four hundred and ninety subband 218 MEO satellites 102–124 discussed herein, the breakeven point 708 seems to be eighteen MEO satellites 102–124 in constellation 100. The present invention indicates that MEO satellites 102–124 above eighteen within such a constellation 100 will not increase the number of LDR users 306–328 at the same linear pace as the first eighteen MEO satellites 102–124 did. If the assumptions about the capabilities of each MEO satellite are different, the breakeven points 608 and 708 may change from eighteen MEO satellites 102–124 to a different number of MEO satellites 102–124 in constellation 100.

Depending on the limitations placed on MEO satellites 102–124, e.g., power, available subbands 218, or other limitations, and the desired design of constellation 100, constellation 100 designers and operators can use the present invention to determine the limits of constellation 100 capabilities, as seen in FIGS. 6 and 7.

Determination of MDR User Capabilities

Figure 8:
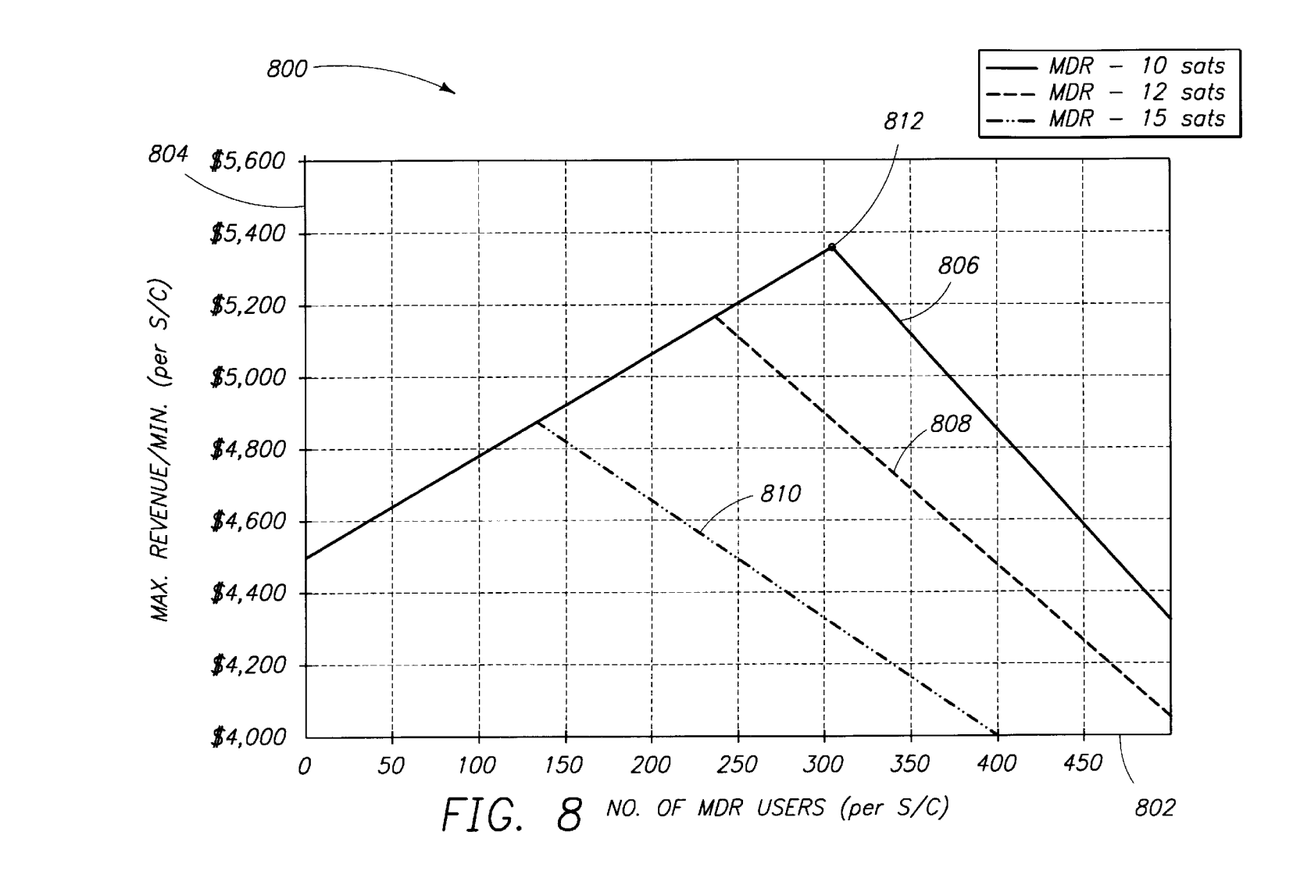
FIG. 8 is a graph indication the number of MDR users per satellite versus the maximum revenue generated per minute per satellite.

FIG. 8 is a graph indication the number of MDR users per satellite versus the maximum revenue generated per minute per satellite.

FIG. 8 illustrates an operational space 800, where horizontal axis 802 indicates the numbers of MDR users 302–304 per MEO satellite 102–124, while vertical axis 804 indicates the maximum revenue generated per minute per MEO satellite 102–124 in constellation 100. Line 806 illustrates the revenue generated in a ten MEO satellite 102–124 constellation, line 808 illustrates the revenue generated in a twelve MEO satellite 102–124 constellation, and line 810 illustrates the revenue generated in a fifteen MEO satellite 102–124 constellation. Note now that the maximum revenue generation point 812 per spacecraft is now at ten MEO satellites 102–124, whereas the maximum revenue generation for a purely LDR user 306–328 system was at eighteen MEO satellites 102–124 in constellation 100.

Figure 9:
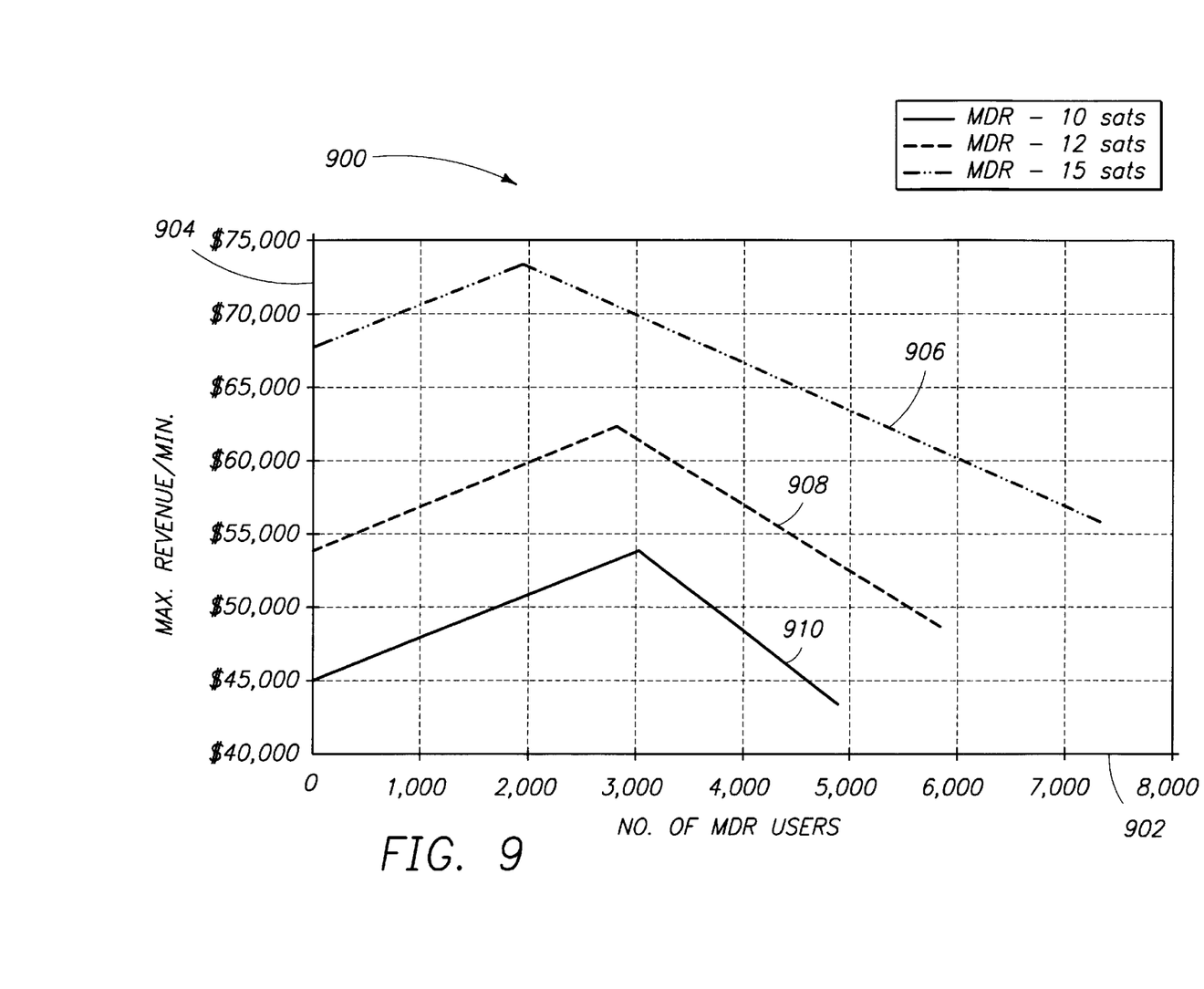
FIG. 9 is a graph indication the number of MDR users in the constellation versus the maximum revenue generated per minute for the entire constellation.

FIG. 9 is a graph indication the number of MDR users in the constellation versus the maximum revenue generated per minute for the entire constellation.

FIG. 9 illustrates an operational space 900, where horizontal axis 902 indicates the numbers of MDR users 302–304 in constellation 100, while vertical axis 904 indicates the maximum revenue generated per minute in constellation 100. Line 906 illustrates the revenue generated in a fifteen MEO satellite 102–124 constellation, line 908 illustrates the revenue generated in a twelve MEO satellite 102–124 constellation, and line 910 illustrates the revenue generated in a ten MEO satellite 102–124 constellation. Note now that the maximum revenue generation is for a constellation 100 that has fifteen MEO satellites 102–124, while the maximum revenue generation per satellite in a fifteen MEO satellite 102–124 constellation is for a ten satellite constellation 100 as shown in FIG. 8. The operational spaces 600, 700, 800, and 900 of the present invention allow the constellation 100 designers, owners, and operators to determine the proper number of MEO satellites 102–124 as well as determining the limits that a given satellite constellation 100 can support. As shown in FIG. 9, if 6,000 MDR users 302–304 are expected to use constellation 100, line 910 indicates that a constellation 100 having ten MEO satellites 102–124 probably cannot support such MDR user 302–304 demands.

Operational spaces 600, 700, 800, and 900 of the present invention allow constellation 100 designers and operators to determine the types of services that constellation 100 can offer at what times and at what prices to users 302–324 to maximize the available services, and thus the available revenues. Power constraints and subband 218 constraints, along with determinations of limits of the constellation 100 to deliver the desired services. The limits determined by the present invention on the size of constellation 100, as well as the determination of the best operational points that constellation 100 should be operated at, assist constellation 100 operators and designers in efficiently designing, maintaining, and operating constellation 100. Maximization of a certain parameter by using the present invention, e.g., subband 218 usage, or group of parameters, e.g., subband 218 usage and power consumption, can increase the efficiency of constellation 100.

Process Chart

Figure 10:
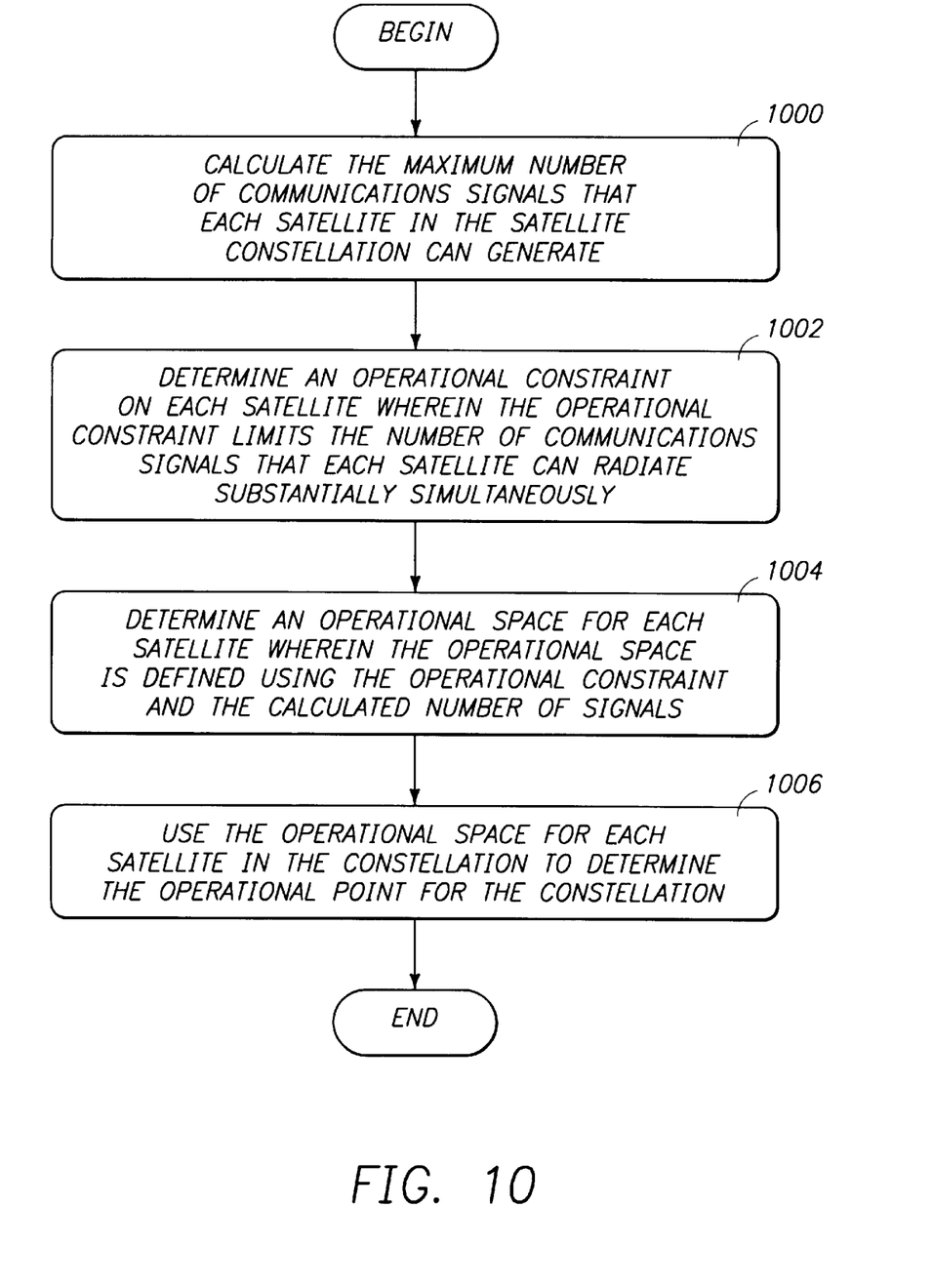
FIG. 10 is a flowchart illustrating the steps used to practice one embodiment of the present invention.

FIG. 10 is a flowchart illustrating the steps used to practice one embodiment of the present invention.

Block 1000 illustrates the present invention performing the step of calculating the maximum number of communications signals that each satellite in the satellite constellation can generate.

Block 1002 illustrates the present invention performing the step of determining an operational constraint on each satellite, the operational constraint limiting the number of communications signals that each satellite can radiate substantially simultaneously.

Block 1004 illustrates the present invention performing the step of determining an operational space for each satellite wherein the operational space is defined using the operational constraint and the calculated number of signals.

Block 1006 illustrates the present invention performing the step of using the operational space for each satellite in the constellation to determine the operational point for the constellation.

Although Blocks 1000–1006 are shown sequentially in FIG. 10, Blocks 1000–1006 can be performed in any order, or in parallel, without departing from the scope of the present invention.

Conclusion

This concludes the description of the preferred embodiment of the invention. The following paragraphs describe some alternative methods of accomplishing the same objects and some additional advantages for the present invention.

Although discussed with respect to radio frequency transmissions, the above described invention can also be used with optical or other information carrying transmission systems to perform the same or similar functions. Further, although described with regard to MEO satellites 102–124, the present invention can be utilized for LEO, GEO, or other orbital dynamic scenarios without departing from the scope of the present invention.

The techniques described in the present invention can be used to make rural mobile telephone service econimically feasible, as well as the ability to utilize present satellite configurations 100 to accomplish this task. Further, the techniques described in the present invention can be utilized to optimize the locations and the numbers of MEO satellites 102–124 in constellation 100 to properly services users 302–328.

In summary, the present invention provides methods for increasing the efficiency of satellite constellation operations. The steps of the present invention comprise calculating the maximum number of communications signals that each satellite in the satellite constellation can generate, determining an operational constraint on each satellite, the operational constraint limiting the number of communications signals that each satellite can radiate substantially simultaneously, determining an operational space for each satellite wherein the operational space is defined using the operational constraint and the calculated number of signals, and using the operational space for each satellite in the constellation to determine the operational point for the constellation.

The foregoing description of the preferred embodiment of the invention has been presented for the purposes of illustration and description and is not intended to be exhaustive or to limit the invention to the precise form disclosed. Many modifications and variations are possible in light of the above teaching. It is intended that the scope of the invention be limited not by this detailed description, but rather by the claims appended hereto.

TABLE 1

| DATA RATE TYPE | MOBILE TERMINAL ANT. GAIN (dB) | kbps | BANDWIDTH/ USER (kHz/user) | NO. OF SUBBAND/ USER* | S/C POWER/ USER (watt/user) | $/min Assumptions | COST PER Mbits ($/Mbits) |
|---|---|---|---|---|---|---|---|
| LDR | 0 | 4 | 4.17 | 0.07 | 0.156 | $7.00 | 4.167 |
| MDR(1) | 10 | 144 | 150 | 0.67 | 0.560 | $4.00 | 0.463 |
| MDR(2) | 15 | 144 | 150 | 0.67 | 0.177 | $4.00 | 0.463 |

MAXIMUM REVENUE PER MINUTE FROM LDR SERVICES PER S/C = $1.00 * 4,500 USERS = $4,500

What is claimed is:

1. A method for determining an operational point for a satellite constellation, comprising the steps of:

calculating the maximum number of communications signals that each satellite in the satellite constellation can generate;

determining an operational constraint on each satellite, the operational constraint limiting the number of communications signals that each satellite can radiate substantially simultaneously;

determining an operational space for each satellite wherein the operational space is defined using the operational constraint and the calculated number of signals; and using the operational space for each satellite in the constellation to determine the operational point for the satellite constellation.

2. The method of claim 1, wherein each satellite in the satellite constellation is in Middle Earth Orbit (MEO).

3. The method of claim 1, further comprising the step of using a communications channel to communicate with multiple communications devices substantially simultaneously.

4. The method of claim 1, wherein the operational space determines a maximum number of signals that each satellite can radiate substantially simultaneously without interference.

5. The method of claim 4, wherein the operational space determines a preferred number of satellites to be used in the satellite constellation.

6. A method for operating a satellite at an increased efficiency, comprising the steps of:

calculating the maximum number of communications signals that the satellite can generate for a first communications service;

determining an operational constraint on the satellite, the operational constraint limiting the number of communications signals that the satellite can radiate substantially simultaneously for the first communications service;

defining a second communications service, the second service using the same communications signals as the first communications service;

determining an operational space for the communications signals, the operational space defined using the first and the second communications services and the operational constraint; and determining the increased efficiency for the satellite using the operational space.

7. The method of claim 6, wherein the satellite is in Middle Earth Orbit.

8. The method of claim 6, wherein the operational constraints are selected as one or more elements selected from a group comprising power limitation, available subbands, available channels, and data rate requirements.

9. The method of claim 6, wherein the increased efficency operational point is determined using at least one element selected from a group comprising revenue generation, bandwidth availability, available power, number of users within a region, and available subbands.

10. The method of claim 6, wherein the step of creating the operational space generates an operational space for a satellite constellation comprising the satellite.

11. A satellite constellation, operated by performing the steps of:

calculating the maximum number of communications signals that each satellite in the satellite constellation can generate;

determining an operational constraint on each satellite, the operational constraint limiting the number of communications signals that each satellite can radiate substantially simultaneously;

determining an operational space for each satellite wherein the operational space is defined using the operational constraint and the calculated number of signals; and using the operational space for each satellite in the constellation to determine the operational point for the satellite constellation.

* * * * *